(12) United States Patent
Baltzer

(10) Patent No.: US 7,144,081 B2
(45) Date of Patent: Dec. 5, 2006

(54) HEADREST FOR ALLEVIATING WHIPLASH INJURY AND THE USE OF SPECIFIC POLYURETHANE FOAMS THEREIN

(76) Inventor: Gunnar Baltzer, Kolmåardsvägen 3, Lidingö (SE) 181 64

( * ) Notice: Subject to any disclaimer, the term of this patent is extended or adjusted under 35 U.S.C. 154(b) by 402 days.

(21) Appl. No.: 10/466,685

(22) PCT Filed: Jan. 21, 2002

(86) PCT No.: PCT/SE02/00091

§ 371 (c)(1),
(2), (4) Date: Jul. 21, 2003

(87) PCT Pub. No.: WO02/060722

PCT Pub. Date: Aug. 8, 2002

(65) Prior Publication Data

US 2004/0051364 A1   Mar. 18, 2004

(30) Foreign Application Priority Data

Feb. 2, 2001   (SE) .................................... 0100324

(51) Int. Cl.
*B60N 2/42* (2006.01)
(52) U.S. Cl. ........................... 297/216.12; 297/DIG. 11
(58) Field of Classification Search ......... 297/DIG. 1, 297/216.12, 391
See application file for complete search history.

(56) References Cited

U.S. PATENT DOCUMENTS 4,744,601 A * 5/1988 Nakanishi .................. 297/391
4,919,483 A * 4/1990 Horkey ....................... 297/395
5,290,091 A * 3/1994 Dellanno et al. ........... 297/391
2002/0060482 A1* 5/2002 Sakakibara et al. ..... 297/216.12

FOREIGN PATENT DOCUMENTS

| DE | 19746413 | 4/1998 |
|---|---|---|
| JP | 10211840 A2 | 11/1997 |
| JP | 11155879 A2 | 11/1997 |
| NO | 300362 | 5/1997 |
| WO | WO 9944856 | 9/1999 |
| WO | WO 00/20248 | 4/2000 |

* cited by examiner

Primary Examiner—Milton Nelson, Jr.
(74) Attorney, Agent, or Firm—McDermott Will & Emery LLP

(57) ABSTRACT

A headrest for alleviating whiplash injury and comprising at least one support member which is uprightly fixed to a seat and a cushioning member of polyurethane foam attached to said at least one support member and enclosed in a covering material is disclosed, wherein the polyurethane foam is one having the following properties: A) A density within the range of 50 to 100 kg/m$_3$; B) a compressive strength between 0.9 and 3.5 mN/mm$_2$ at 25% deformation and between 1.3 and 4.5 mN/mm$_2$ at 40% deformation; C) a glass transition temperature, Tg (DSC), between –10° C. and +10° C., preferably –5° C. to +4° C.; D) a loss temperature peak maximum between 15 and 30° C.; E) a temperature range for the loss peak between –40° C. and +90° C.; and F) a loss peak area between 4.0 and 8.0.

10 Claims, 1 Drawing Sheet

HEADREST FOR ALLEVIATING WHIPLASH INJURY AND THE USE OF SPECIFIC POLYURETHANE FOAMS THEREIN

TECHNICAL FIELD

The present invention relates to a headrest for alleviating whiplash injury and the use of polyurethane foams having specific properties therein.

BACKGROUND ART

An increasing motor traffic in densely built-up areas has resulted in an increase in the number of car crashes and thereby also in an increase in the injuries to passengers. It has turned out that rear-end collisions at low speed often results in so-called whiplash injury. Such injuries have become one of the predominant problems in the automotive industry from the point of view of passenger's safety.

A theoretical survey of the causes for whiplash injuries revealed that such injuries mainly occur due to the momentum the head has during the movement of the vehicle caused by the collision. As soon as the vehicle collides, the head is being pushed back with a force that is proportional to the speed of the vehicle caused by the collision. The head hits the headrest as a result of this backward movement of the head and rebounds back with a force which is very much dependent on the resilience behaviour of the material which is being used in the headrest. In addition to the rebound force, the extent of head displacement after the rebound is also very important from the whiplash point of view.

A number of headrests claiming to alleviate whiplash injury have been disclosed in the past.

Thus, for instance, DE 197 46 413 A1 discloses a headrest comprising a support member fixed to a seat and a cushioning member of polyurethane foam attached to said support member and enclosed in a covering material. The cushioning member of this prior art headrest should be made of a material having a low rebound elasticity of 30% or lower, preferably 25% or lower. In an embodiment of the headrest a combination of two cushioning members are used, one having a rebound elasticity of 10% or lower and the other having a higher rebound elasticity in order to improve the feeling of the headrest. According to Table 1 rebound elasticity values of lower than 10% are obtained by means of polyurethanes having a density of from 160 kg/m$^3$ to 195 kg/m$^3$.

PCT WO95/05954 discloses a headrest including a cushion which is filled with a fluid and is equipped with one or more weakened areas or openings covered by a sealing arrangement. At a predetermined pressure against or in the cushion the fluid is displaced into a recipient outside the cushion with a defined fluid flow rate.

Another headrest based on the same basic idea of a cushion filled with a fluid which is displaced into a recipient outside the cushion on collision is disclosed by U.S. Pat. No. 3,680,912.

SUMMARY OF THE INVENTION

It is an object of the present invention to provide a headrest having improved properties from whiplash injury point of view in comparison with headrests in general use in cars.

It is another object of the present invention to provide a headrest having a cushioning member which is simple in its construction and is made of a material which is harmless to the environment.

It is still another object of the present invention to provide a headrest having a cushioning member made of a material which minimizes the head displacement under normal ambient conditions under different collision situations.

According to the present invention it was found that there are several material properties which are of utmost importance so far the rebound displacement is concerned, namely
A) the density;
B) the compressive force at different deformations;
C) the glass transition temperature (Tg); and the viscoelastic properties, expressed as
D) the loss peak maximum;
E) the temperature range for the loss peak; and
F) the loss peak area.

On basis of these findings the present invention comprises a headrest for alleviating whiplash injury and comprising at least one support member which is uprightly fixed to a seat and a cushioning member of polyurethane foam attached to said at least one support member and enclosed in a covering which headrest is characterized in that the polyurethane foam is one having the following properties:

A) A density within the range of 50 to 100 kg/m$^3$, preferably 90 to 100 kg/M$^3$;
B) a compressive strength between 0.9 and 3.5 mN/mm$^2$, preferably 1.0 to 3.0 mN/mm$^2$ at 25% deformation and between 1.3 and 4.5 mN/mm$^2$, preferably 1.3 to 3.8 mN/mm$^2$ at 40% deformation;
C) a glass transition temperature, Tg (DSC), between −10° C. and +10° C., preferably −5° C. to +4° C.;
D) a loss temperature peak maximum between 15 and 30° C., preferably 16 to 26° C.;
E) a temperature range for the loss peak between −40° C. and +90° C.; and
F) a loss peak area between 4.0 and 8.0, preferably 5.0 to 6.5.

According to another aspect, the present invention relates to a cushioning member to be attached to a conventional headrest, which cushioning member comprises a polyurethane foam as defined above enclosed in a covering material.

According to a further aspect, the present invention relates to the use of a polyurethane foam material having properties A) to F) as defined above as a cushioning material in headrest of motor vehicles or in a cushioning member as defined above.

BRIEF DESCRIPTION OF THE DRAWINGS

The objects, advantages and features of this invention will be more readily appreciated from the following detailed description when read in conjunction with the accompanying drawings in which.

DETAILED DESCRIPTION

The present invention is generally applicable to headrests for motor vehicles, primarily automobiles and busses, which headrests comprise at least one support member which is uprightly fixed to a seat and a cushioning member attached to said at least one support member and enclosed in a covering material irrespective of the detailed construction of the support member or members and the way the cushioning member is attached to said support member or members.

Also the exact configuration of the cushioning member is of subordinate importance in that generally the conventional shapes of the cushioning members of prior art headrests can be utilized.

Figure 1:
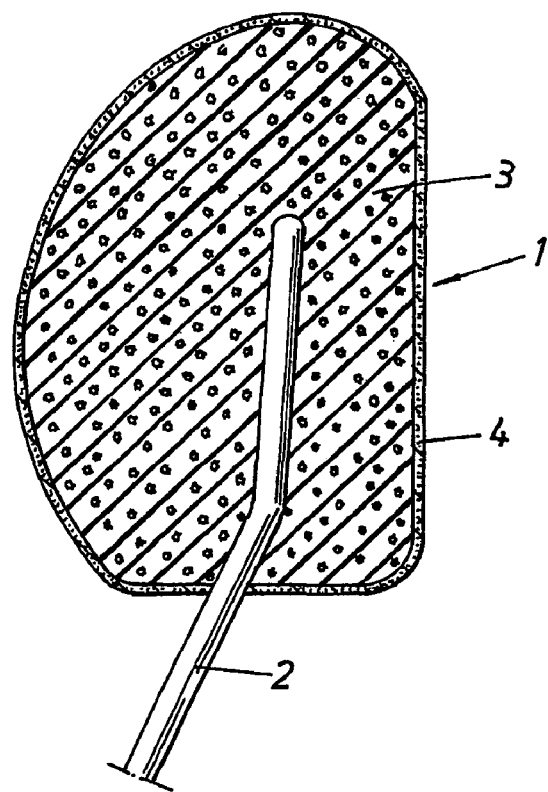
FIG. 1 is a side sectional illustration of a headrest according to the invention.

FIG. 1 illustrates, as a non-limiting example, a headrest according to the invention in a conventional design.

Shown in FIG. 1 is a headrest 1 comprising a support member 2, which is uprightly fixed to a seat (not shown) of a vehicle such as an automobile, and a cushioning member 3 of polyurethane foam in which the support member 2 is embedded. The cushioning member 3 is enclosed in a covering 4, e.g. of cloth or similar, soft material.

According to the present invention the cushioning member 3 is made of a polyurethane foam having the following properties:
A) A density within the range of 50 to 100 kg/m$^3$, preferably 90 to 100 kg/m$^3$;
B) a compressive strength between 0.9 and 3.5 mN/mm$^2$, preferably 1.0 to 3.0 mN/mm$^2$ at 25% deformation and between 1.3 and 4.5 mN/mm$^2$, preferably 1.3 to 3.8 mN/mm$^2$ at 40% deformation;
C) a glass transition temperature, Tg (DSC), between −10° C. and +10° C., preferably −5° C. to +4° C.;
D) a loss temperature peak maximum between 15 and 30° C., preferably 16 to 26° C.;
E) a temperature range for the loss peak between −40° C. and +90° C.; and
F) a loss peak area between 4.0 and 8.0, preferably 5.0 to 6.5.

Of these properties those relating to the viscoelasticity of the material (i.e. those denoted D), E) and F) above) were found to be of greatest importance.

Thus, the invention is based on the concept of using as the cushioning in the headrest of a motor vehicle a material which has a maximum absorption of energy within the temperature range usually found within the coupe of an automobile, i.e. within the temperature range of from 15° C. to 30° C., and also has a high overall absorption of energy.

These properties can be measured by using a Dynamic Mechanical Analyser (DMA) giving a graph from which the temperature of the loss peak maximum (i.e. the temperature of maximum absorption of energy) can be read and the overall absorption of energy can be calculated (expressed as the loss peak area).

According to one embodiment of the headrest of the present invention the polyurethane foam is one having the following properties:
A density within the range of from 96 to 98 kg/m$^3$;
a compressive strength of 2.7 to 2.8 mN/mm$^2$ at 25% deformation and 3.5 to 3.6 at 40% deformation;
a glass transition temperature Tg (DSC) of 2° C. to 4° C.;
a loss temperature peak maximum of 20.5° C. to 22.5° C.;
a temperature range for the loss peak between of −37 and +90° C.; and
a loss peak area of 5.5 to 5.6.

According to another embodiment of the headrest of the present invention the polyurethane foam is one having the following properties:
A density within the range of from 61 to 63 kg/m$^3$;
a compressive strength of 1.15 to 1.3 mN/mm$^2$ at 25% deformation and 1.4 to 1.5 at 40% deformation;
a glass transition temperature, Tg (DSC), of −5° C. to −2° C.;
a loss temperature peak maximum of 16.0° C. to 18.0° C.;
a temperature range for the loss peak between of −30 and +90° C.; and
a loss peak area of 6.0 to 6.2.

According to a third embodiment of the headrest of the present invention the polyurethane foam is one having the following properties:
A density within the range of from 92 to 94 kg/m$^3$;
a compressive strength of 1.0 to 1.1 mN/mm$^2$ at 25% deformation and 1.3 to 1.4 at 40% deformation;
a glass transition temperature, Tg (DSC), of −1° C. to +1° C.;
a loss temperature peak maximum of 24.0° C. to 25.5° C.;
a temperature range for the loss peak between of −40 and +85° C.; and
a loss peak area of 5.8 to 5.95.

Materials and Methods

Figure 2:
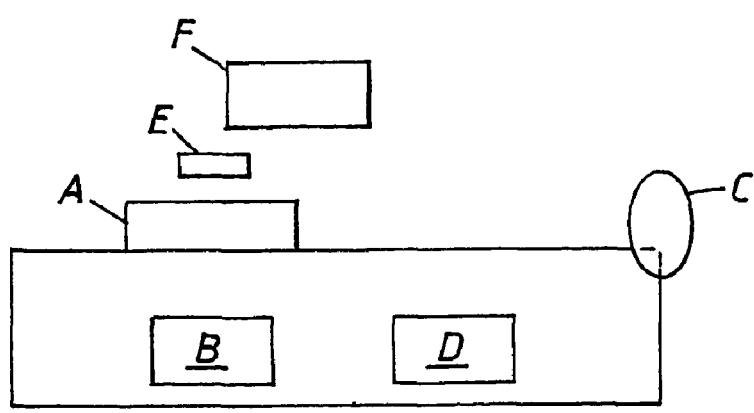
FIG. 2 is a schematic illustration of the equipment used for the evaluation of the deformation behaviour of headrests due to the impact of a solid body having a mass corresponding to that of a human head at a selected speed.

A schematic illustration of the equipment used for the evaluation of the deformation behaviour of headrests due to the impact of a solid body having a mass corresponding to that of a human head at a selected speed is given in FIG. 2.

In FIG. 2A denotes a solid body in the form of a carriage having a mass of 3.5 kg (intended to illustrate approximately the mass of a young human's head) or, alternatively, 4.5 kg (corresponding approximately to the average mass of an adult human's head) and mounted on a roller conveyor. The anterior end of the carriage has a rounded shape similar to a human's neck.

B represents a system giving the carriage a preset speed.

C represents the test object, which either is a head rest according to the invention having a cushioning member of polyurethane foam complying with the requirements A) to F) above or is a head rest from a car generally found on the market.

D represents a registration equipment which registers the speed of the carriage A when penetrating into the test object C and when leaving the test object C on rebounce; the extent of penetration into the test object C; the retardation; and the time the carriage A is in contact with the test object C.

E is an accelerometer attached to the carriage A.

F represents a display equipment in the form of a digital real-time oscilloscope.

Using the equipment above headrests according to the invention having cushioning members of the following polyurethane foam materials were tested:

I1 (representing a first embodiment of the present invention): A polyurethane foam having the following properties:
Density: 97 kg/m$^3$
Compressive strength: 2.74 mN/mm$^2$ at 25% deformation 3,56 mN/mm$^2$ at 40% deformation
Glass transition temperature, Tg, measured by means of Differential Scanning Calorimeter (DSC): 2.9° C.
Loss peak maximum: 21.3° C.
Temperature range for loss peak: −37° C. to +90° C.
Loss peak area: 5.534.

This material is available under the trade name "KP 73" from PP Polymer AB, Vällingby, Sweden, and was used in a thickness of 50 mm.

I2 (representing a second embodiment of the present invention): A polyurethane foam having the following properties:
Density: 62 kg/m$^3$
Compressive strength: 1.20 mN/mm$^2$ at 25% deformation 1.43 mN/mm$^2$ at 40% deformation
Tg (DSC): −3.5° C.
Loss peak maximum: 17° C.
Temperature range for loss peak: −25° C. to +90° C.
Loss peak area: 6.106.

This material is available under the trade name "KP 77" from PP Polymer AB, Vällingby, Sweden, and was used in a thickness of 50 mm.

I3 (representing a third embodiment of the present invention): A polyurethane foam having the following properties:
Density: 93 kg/m$^3$
Compressive strength: 1.08 mN/mm$^2$ at 25% deformation
    1.34 mN/mm$^2$ at 40% deformation
Tg (DSC): −0.1° C.
Loss peak maximum: 24.7° C.
Temperature range for loss peak: −40° C. to +85° C.
Loss peak area: 5.86.

This material is available under the trade name "KP 78" from PP Polymer AB, Vällingby, Sweden, and was used in a thickness of 60 mm.

Using the same equipment three headrests taken from cars generally found on the market were tested as a comparison.

C1 (comparison): A headrest from an automobile of US make and having a cushioning member of polyurethane foam with a thickness of 40 mm and the following properties:
Tg (DSC): 51.8° C.
Loss peak maximum: −42.8° C.
Temperature range for loss peak: −66° C. to +38.8° C.
Loss peak area: 1.344.

C2 (comparison): A headrest from an automobile of a first German make having a cushioning member of polyurethane foam with a thickness of 50 mm.

C3 (comparison): A headrest from an automobile of a second German make having a cushioning member of polyurethane foam with at thickness of 25 mm.

The glass transition temperature was measured by the Differential Scanning Calorimeter method (Pyris 1 from Perkin Elmer).

Compressive strength and viscoelastic properties were measured using Dynamic Mechanical Analyser (DMA) (DMA 7 from Perkin Elmer). Viscoelastic measurements were performed by using parallel plate probe under dynamic stress conditions at 1.00 Hz frequency whereas compressive strengths were measured using static stress conditions.

The carriage A was driven at a constant, prechosen velocity until a distance of 80 mm from the test object C, until when it was momentaneously released from the driving means to run freely until the impact against the test object. Three different velocities were chosen for the experiments: 1 m/s, 2 m/s and 3 m/s.

The position of the anterior end of the carriage was registered continuously by means of a recorder after the impact against the test object. All tests were performed at ambient temperature (about 17° C.).

Results thus obtained are reported in Tables 1 to 4 below.

TABLE 1

Penetration of carriage into test object

| Test object | Thickness of test object [mm] | Penetration [mm] at impact velocity of | | |
|---|---|---|---|---|
| | | 1 m/s | 2 m/s | 3 m/s |
| A. Mass of carriage: 3.5 kg | | | | |
| I1 | 50 | 11 | 21 | 30 |
| I2 | 50 | 13 | 24 | 33 |
| I3 | 60 | 15 | 26 | 34 |
| C1 | 40 | 25 | 38 | 38 |
| C2 | 50 | 25 | 39 | 49 |
| C3 | 25 | 18 | 31 | 38 |

TABLE 1-continued

Penetration of carriage into test object

| Test object | Thickness of test object [mm] | Penetration [mm] at impact velocity of | | |
|---|---|---|---|---|
| | | 1 m/s | 2 m/s | 3 m/s |
| B. Mass of carriage: 4.5 kg | | | | |
| I1 | 50 | 15 | 25 | 34 |
| I2 | 50 | 17 | 29 | 37 |
| I3 | 60 | 16 | 28 | 36 |
| C1 | 40 | 27 | 43 | 51 |
| C2 | 50 | 26 | 45 | 55 |
| C3 | 25 | 20 | 33 | 41 |

TABLE 2

Time of carriage in test object

| Test object | Time [ms] in test object at impact velocity of | | |
|---|---|---|---|
| | 1 m/s | 2 m/s | 3 m/s |
| A. Mass of carriage: 3.5 kg | | | |
| I1 | 63 | 66 | 66 |
| I2 | 87 | 88 | 91 |
| I3 | 140 | 125 | 97 |
| C1 | 80 | 70 | 65 |
| C2 | 80 | 75 | 65 |
| C3 | 70 | 52 | 46 |
| B. Mass of carriage: 4.5 kg | | | |
| I1 | 77 | 85 | 90 |
| I2 | 120 | 135 | 140 |
| I3 | 135 | 125 | 120 |
| C1 | 100 | 82 | 73 |
| C2 | 95 | 80 | 70 |
| C3 | 70 | 60 | 55 |

TABLE 3

Rebound velocity in % of impact velocity

| Test object | Rebound velocity, % of impact velocity at impact velocity of | | |
|---|---|---|---|
| | 1 m/s | 2 m/s | 3 m/s |
| A. Mass of carriage: 3.5 kg | | | |
| I1 | 21 | 25 | 26 |
| I2 | 0 | 16 | 14 |
| I3 | 0 | 13 | 19 |
| C1 | 62 | 55 | 40 |
| C2 | 63 | 63 | 48 |
| C3 | 55 | 62.5 | 63 |
| B. Mass of carriage: 4.5 kg | | | |
| I1 | 24 | 15 | 15 |
| I2 | 0 | 13 | 13 |
| I3 | 0 | 10 | 14 |
| C1 | 55 | 50 | 41 |
| C2 | 71 | 62 | 48 |
| C3 | 59 | 60 | 56 |

TABLE 4

Retardation of carriage at impact

| Test object | Retardation [xg] at impact velocity of | | |
|---|---|---|---|
| | 1 m/s | 2 m/s | 3 m/s |
| A. Mass of carriage: 3.5 kg | | | |
| I1 | 6 | 13 | 19 |
| I2 | 6 | 12 | 19 |
| I3 | 4 | 10.5 | 17 |
| C1 | 5 | 15 | 21 |
| C2 | 4.5 | 10.5 | 19.5 |
| C3 | 5.5 | 16 | 26 |
| B. Mass of carriage: 4.5 kg | | | |
| I1 | 5 | 10 | 17 |
| I2 | 4 | 10 | 15 |
| I3 | 4 | 9 | 15 |
| C1 | 4.5 | 14.5 | 25 |
| C2 | 4 | 11 | 19.5 |
| C3 | 4.5 | 14 | 23 |

Table 1A shows the maximum penetration of the anterior end of the carriage having av mass of 3.5 kg (approximately corresponding to that of a young person's head) into the cushioning members of the different test objects at the different velocities at which the carriage was caused to impact against the test objects (1 m/s, 2 m/s and 3 m/s).

Table 1B shows the maximum penetration of the anterior end of the carriage having a mass of 4.5 kg (approximately corresponding to that of an adult person's head) into the cushioning members of the different test objects at the different velocities at which the carriage was caused to impact against the test objects.

In addition, the thicknesses of the different test objects have been given in Tables 1A and 1B.

From Table 1A it is seen that the penetration of the carriage having a mass representing that of a young person's head into test objects I1 to I3 according to the invention is considerably lower than the penetration into the prior art test objects at the tested velocities at impact (1 m/s, 2 m/s and 3 m/s). Moreover, it may be seen that the penetration into I1, I2, I3 and C2 is less than the thickness of the cushioning member at all three velocities but C2 seems to reach a plateau value. On the other hand, the penetration into C1 is wider than the thickness thereof at the velocity of 3 m/s and into C3 it is wider than the thickness already at the velocity of 2 m/s.

From Table 1B it is seen that the penetration of the carriage having a mass representing that of an adult person's head into test objects I1 to I3 according to the invention is lower than the penetration into the prior art test objects at the tested velocities (1 m/s, 2 m/s and 3 m/s). Moreover, it may be seen that the penetration into I1, I2 and I3 is less than the thickness of the cushioning member at all the three velocities, whereas the penetration into C2 is wider than the thickness thereof at 3 m/s and in case of C1 and C3 the penetration is wider than the thickness already at the velocity of 2 m/s.

Table 2A shows the time the anterior end of the carriage having a mass of 3.5 kg is within the test object before leaving it on rebound at the different velocities at which the carriage was caused to impact against the test objects (i.e. 1 m/s, 2 m/s and 3 m/s).

Table 2B shows the time the anterior end of the carriage having a mass of 4.5 kg is within the test object before leaving it on rebound as a function of the velocity at which the carriage impacts against the test objects.

From Table 2A it is seen that the anterior end of the carriage is within the test objects I2 and I3 according to the invention for a longer period than in any of the prior art test objects C1, C2 and C3 at the tested velocities of 1 m/s, 2 m/s and 3 m/s, whereas in case of I1 according to the invention the anterior end of the carrier is therein for a shorter period than in the prior art test objects at 1 m/s, for a longer period than in C3 at 2 m/s and for about the same period as in C1 and C2 at 3 m/s.

From Table 2B it is seen that the anterior end of the carriage also in case of the heavier mass of the carriage is within the test objects I2 an d I3 according to the invention for a longer period than in any of the prior art test objects C1, C2 and C3 at all the tested velocities, whereas it is in test object I1 according to the invention for a longer period than in C3 at all the tested velocities and for a longer period than in C1 and C2 at the velocities of 2 m/s and 3 m/s.

Table 3A shows the velocity of the anterior end of the carriage having av mass of 3.5 kg when leaving the test object on rebound in % of the velocity at impact as a function of the impact velocity.

Table 3B shows the velocity of the anterior end of the carriage having av mass of 4.5 kg when leaving the test object on rebound in % of the velocity at impact as a function of the impact velocity.

On rebound the anterior end of the carriage had to move a distance of at least 50 mm from the test object in order to enable measurements. The value 0% in case of test objects I2 and I3 according to the present invention at the impact speed of 1 m/s means that the rebound was less than 50 mm from the test objects.

From Tables 3A and 3B it is seen that the test objects I1, I2 and I3 according to the invention are more effective than the prior art test objects in reducing the rebound velocity at all impact velocities tested.

Table 4A shows the retardation in number of gravities at the impact of the carriage having a mass of 3.5 kg against the test objects at the different impact velocities.

Table 4B shows the retardation in number of gravities at the impact of the carriage having a mass of 4.5 kg against the test objects at the different impact velocities.

From Tables 4A and 4B it is seen that the retardation is considerably milder in case test objects I1, I2 and I3 according to the invention than in case of the prior art test objects at the higher mass of 4.5 kg at the higher velocities of 2 m/s and 3 m/s (corresponding to 7.2 km/h and 10.8 km/h, respectively).

Thus from Tables 1–4 the advantageous rebound reducing properties of the headrests according to the invention in comparison with the prior art headrests tested may be seen.

The invention claimed is:

1. A headrest for alleviating whiplash injury comprising at least one support member which is uprightly fixed to a seat and a cushioning member of polyurethane foam attached to said at least one support member and enclosed in a covering material, the polyurethane foam having the following properties:
   A) A density within the range of 50 to 100 kg/m$^3$;
   B) a compressive strength between 0.9 and 3.5 mN/mm$^2$ at 25% deformation and between 1.3 and 4.5 mN/mm$^2$ at 40% deformation;
   C) a glass transition temperature, Tg, between −10° C. and +10° C.;
   D) a loss temperature peak maximum between 15 and 30° C.;

E) a temperature range for the loss peak between −40° C. and +90° C.; and

F) a loss peak area between 4.0 and 8.0.

2. The headrest according to claim 1, the polyurethane foam having the following properties:

a density within a range of from 96 to 98 kg/m$^3$;

a compressive strength of 2.7 to 2.8 mN/mm$^2$ at 25% deformation and 3.5 to 3.6 at 40% deformation;

a glass transition temperature, Tg, of 2° C. to 4° C.;

a loss temperature peak maximum of 20.5° C. to 22.5° C.;

a temperature range for the loss peak between −37 and +90° C.; and a loss peak area of 5.5 to 5.6.

3. The headrest according to claim 1, the polyurethane foam having the following properties:

a density within a range of from 61 to 63 kg/m$^3$;

a compressive strength of 1.15 to 1.3 mN/mm$^2$ at 25% deformation and 1.4 to 1.5 at 40% deformation;

a glass transition temperature, Tg, of −5° C. to −2° C.;

a loss temperature peak maximum of 16.0° C. to 18.0° C.;

a temperature range for the loss peak between −30 and +90° C.; and a loss peak area of 6.0 to 6.2.

4. The headrest according to claim 1, the polyurethane foam having the following properties:

a density within a range of from 92 to 94 kg/m$^3$;

a compressive strength of 1.0 to 1.1 mN/mm$^2$ at 25% deformation and 1.3 to 1.4 at 40% deformation;

a glass transition temperature, Tg, of −1° C. to +1° C.;

a loss temperature peak maximum of 24.0° C. to 25.5° C.;

a temperature range for the loss peak between −40 and +85° C.; and a loss peak area of 5.8 to 5.95.

5. Cushioning member to be attached to a conventional headrest, which cushioning member comprises a polyurethane foam as defined in any of claims 1 to 4.

6. The use of a polyurethane foam material as defined in any of claims 1 to 4 as a cushioning material in headrests of motor vehicles or in a cushioning member attached to a conventional headrest.

7. The headrest of claim 1, wherein the density is within the range of 90 to 100 kg/m$^3$.

8. The headrest of claim 1, wherein the compressive strength is between 1.0 to 3.0 mN/mm$^2$ at 25% deformation and between 1.3 to 3.8 mN/mm$^2$ at 40% deformation.

9. The headrest of claim 1, wherein the glass transition temperature is between −5° C. to +4° C.

10. The headrest of claim 1, wherein the loss temperature peak maximum is between 16 to 26° C. and the loss peak area is between 5.0 to 6.5.

* * * * *